(12) United States Patent
Chen et al.

(10) Patent No.: US 7,601,664 B2
(45) Date of Patent: *Oct. 13, 2009

(54) OLEFIN POLYMERIZATION CATALYST COMPOSITIONS AND METHOD OF PREPARATION

(75) Inventors: Linfeng Chen, Sugar Land, TX (US); Richard A. Kemp, Albuquerque, NM (US); Thomas L. Nemzek, Katy, TX (US)

(73) Assignee: Union Carbide Chemicals & Plastics Technology Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/903,309

(22) Filed: Jul. 30, 2004

(65) Prior Publication Data

US 2005/0003953 A1  Jan. 6, 2005

Related U.S. Application Data

(63) Continuation of application No. 10/080,046, filed on Feb. 20, 2002, now abandoned.

(60) Provisional application No. 60/294,186, filed on May 29, 2001.

(51) Int. Cl.
*B01J 31/00* (2006.01)
(52) U.S. Cl. ........................ 502/104; 502/118
(58) Field of Classification Search ............... 502/118, 502/104
See application file for complete search history.

(56) References Cited

U.S. PATENT DOCUMENTS

| | | | |
|---|---|---|---|
| 4,159,963 A * | 7/1979 | Sakurai et al. ............. 502/116 |
| 4,330,649 A | 5/1982 | Kioka et al. |
| 4,442,276 A | 4/1984 | Kashiwa et al. |
| 4,460,701 A | 7/1984 | Terano et al. |
| 4,472,521 A * | 9/1984 | Band ........................ 502/104 |
| 4,540,679 A | 9/1985 | Arzoumanidis et al. |
| 4,547,476 A | 10/1985 | Terano et al. |
| 4,548,915 A | 10/1985 | Goodall et al. |
| 4,673,719 A * | 6/1987 | Kioka et al. ............... 502/125 |
| 4,728,705 A | 3/1988 | Nestlerode et al. |
| 4,816,433 A | 3/1989 | Terano et al. |
| 4,829,037 A | 5/1989 | Terano et al. |
| 4,927,797 A | 5/1990 | Ewen |
| 4,990,479 A * | 2/1991 | Ishimaru et al. ............. 502/125 |
| 5,028,671 A | 7/1991 | Kioka et al. |
| 5,034,361 A | 7/1991 | Job et al. |
| 5,066,737 A | 11/1991 | Job |
| 5,066,738 A | 11/1991 | Ewen |
| 5,077,357 A | 12/1991 | Job |
| 5,082,907 A | 1/1992 | Job |
| 5,093,415 A * | 3/1992 | Brady et al. ................ 525/53 |
| 5,106,806 A | 4/1992 | Job |
| 5,126,302 A * | 6/1992 | Masino ....................... 502/116 |
| 5,146,028 A | 9/1992 | Job |
| 5,151,399 A | 9/1992 | Job |
| 5,153,158 A | 10/1992 | Kioka et al. |
| 5,229,342 A | 7/1993 | Job |
| 5,247,031 A | 9/1993 | Kioka et al. |
| 5,247,032 A | 9/1993 | Kioka et al. |
| 5,438,110 A | 8/1995 | Ishimaru et al. |
| 5,773,535 A * | 6/1998 | Friedrich et al. .......... 526/124.6 |
| 6,207,607 B1 * | 3/2001 | Garoff et al. ............... 502/127 |
| 6,825,146 B2 * | 11/2004 | Kilty et al. ................. 502/107 |
| 6,831,032 B2 * | 12/2004 | Spaether ..................... 502/103 |

FOREIGN PATENT DOCUMENTS

| | | |
|---|---|---|
| EP | 0712869 A | 5/1996 |
| EP | 0743326 A | 11/1996 |
| JP | 59124909 | 7/1984 |

* cited by examiner

*Primary Examiner*—Elizabeth D Wood

(57) ABSTRACT

A method of making a solid procatalyst composition for use in a Ziegler-Natta olefin polymerization catalyst composition, said method comprising:

contacting a precursor composition comprising a magnesium compound with a titanium halide compound and an internal electron donor in any order, in a suitable reaction medium to prepare a solid procatalyst composition, separating the solid procatalyst from the reaction medium, extracting the solid procatalyst composition by contacting the same one or more times with a liquid diluent at an elevated temperature for a period of time sufficient to prepare a solid procatalyst composition having a decreased titanium content compared to the titanium content of the solid procatalyst composition before said extraction, and recovering the solid procatalyst composition.

13 Claims, No Drawings

OLEFIN POLYMERIZATION CATALYST COMPOSITIONS AND METHOD OF PREPARATION

CROSS REFERENCE STATEMENT

This application is a continuation of U.S. Ser. No. 10/080,046, filed Feb. 20, 2002, now abandoned which in turn claims benefit of priority from Provisional application 60/294,186, filed May 29, 2001.

BACKGROUND OF THE INVENTION

The present invention relates to improved polymerization catalyst compositions of the Ziegler-Natta type, procatalysts for use in forming such catalyst compositions, methods of making such catalyst compositions and procatalysts, and to methods of using the catalyst compositions to make an olefin polymer.

Polymers and copolymers of lower α-olefins, particularly, ethylene, propylene and butylene are widely used throughout the world. These polymeric products typically are relatively inexpensive to manufacture, and they exhibit a number of commercially useful properties. When ethylene is polymerized, the process is relatively uncomplicated in that the product type is not influenced by the manner in which the ethylene molecules add to the growing polymeric chain during polymerization. The polymeric product of ethylene does not generally exist in stereoisomeric forms.

When propylene is polymerized, however, the presence of pendant methyl groups on the polymeric chain provides a possibility of several stereo structures, depending on the manner in which propylene molecules add to the growing chain. Most commercial polypropylene results from the stereoregular addition of propylene molecules in an isotactic configuration. Molecules of polymer having a large amount of stereo-irregular propylene units are amorphous, or non-crystalline, and this form is less desirable than the isotactic form. If present in a significant proportion, the non-crystalline polymer must be removed to provide a more desirable, highly crystalline material. Such non-crystalline polymer is often referred to in the art as "atactic", although in reality it contains both atactic, short run isotactic, short run syndiotactic, and regio-irregular oligomeric molecules.

The degree of tacticity of polypropylene can be measured by determining the percentage of polymer soluble in a solvent, such as xylene. Stereoregular polypropylene polymers having a high percentage of atactic polymer are said to have a high xylene soluble fraction. A higher amount of atactic polymer tends to decrease the crystallinity, and consequently, the stiffness (flexural modulus) of the polymer.

It is known that the amount of atactic polymer formed during a polymerization can be decreased (also known as increasing the stereoselectivity of the polymerization) by using a selectivity control agent (SCA) also referred to as an external electron donor. Suitable SCAs include silane compounds, particularly dicyclopentyl dimethoxysilane (DCPDMS), cyclopentyl trimethoxysilane (CPTMS), or dicyclohexyldimethyoxysilane (DCHDMS) disclosed in U.S. Pat. Nos. 4,990,479, 5,438,110, and elsewhere.

Ziegler-Natta olefin polymerization catalyst compositions typically comprise a solid component containing magnesium, titanium and halide moieties in combination with an internal electron donor (referred to as the "procatalyst"), a substance that is capable of converting the procatalyst to an active polymerization catalyst (referred to as a "cocatalyst"), and (if used to polymerize higher α-olefins to produce tactic polymers) an SCA or external donor. Suitable internal electron donors include aromatic mono- or di-esters or ether derivatives thereof, such as benzoates, phthalates, and $C_{1-4}$ alkyl ethers thereof. Conventional cocatalysts include aluminum trialkyls, such as triethylaluminum or triisobutylaluminum, and alumoxanes. The cocatalyst may be combined or complexed with some or all of the internal electron donor, selectivity control agent, or both, if desired. Although variations in any of these catalyst components will influence the performance of the resultant catalyst, the component that appears to offer the greatest opportunity for modification to produce greater catalyst activity is the procatalyst.

The literature is rife with disclosures relating to the various known methods of preparing procatalysts. Examples include: U.S. Pat. Nos. 5,247,032, 5,247,031, 5,229,342, 5,153,158, 5,151,399, 5,146,028, 5,106,806, 5,082,907, 5,077,357, 5,066,738, 5,066,737, 5,034,361, 5,028,671, 4,990,479, 4,927,797, 4,829,037, 4,816,433, 4,728,705, 4,548,915, 4,547,476, 4,540,679, 4,472,521, 4,460,701, 4,442,276, and 4,330,649. One preferred method from among the foregoing disclosures is a method of forming the precursor from a mixture of magnesium dialkoxides and titanium alkoxides that are reacted (chlorinated) with titanium tetrachloride in the presence of an alcohol, an aromatic hydroxide compound, and an aromatic solvent, especially chlorobenzene. In this manner, a solid, highly porous precursor is recovered by selective precipitation upon removal of alcohol from the solution. Also among the foregoing disclosures, U.S. Pat. No. 4,829,037, discloses heat treating the procatalyst in the presence or absence of a solvent, as well as washing the resulting procatalyst multiple times with n-heptane between chlorination steps and after chlorination.

SUMMARY OF THE INVENTION

According to the present invention, there is provided a method of making a solid procatalyst composition for use in a Ziegler-Natta olefin polymerization catalyst composition, said method comprising:

contacting a precursor composition comprising a magnesium compound with a titanium halide compound and an internal electron donor in any order, in a suitable reaction medium to prepare a solid procatalyst composition, separating the solid procatalyst from the reaction medium, extracting the solid procatalyst composition by contacting the same one or more times with a liquid diluent at an elevated temperature for a period of time sufficient to prepare a solid procatalyst composition having a decreased titanium content compared to the titanium content of the solid procatalyst composition before said extraction, and recovering the solid procatalyst composition.

Also included in the present invention are the solid procatalysts resulting from the foregoing methods of preparation, olefin polymerization catalysts comprising one or more of the foregoing procatalyst compositions, a cocatalyst, and a selectivity control agent, an improved olefin polymerization process comprising contacting an olefin monomer in the presence of the foregoing catalyst composition, as well as polyolefin polymers formed thereby.

The catalyst compositions of the present invention are useful in preparing α-olefin polymers having a reduced xylene solubles content and an increased stiffness, as evidenced by an increased modulus, especially flexural modulus. The catalysts of the invention also have higher productivity and produce α-olefin polymers having higher bulk density. Moreover, they enable the use of reduced hydrogen levels to achieve equivalent polymer molecular weight, require reduced quantities of selectivity control agents, and produce polymers having reduced oligomer contents.

DETAILED DESCRIPTION

All reference to the Periodic Table of the Elements herein shall refer to the Periodic Table of the Elements, published and copyrighted by CRC Press, Inc., 1999. Also, any reference to a Group or Groups shall be to the Group or Groups as reflected in this Periodic Table of the Elements using the IUPAC system for numbering groups. For purposes of United States patent practice, the contents of any patent, patent application or publication referenced herein are hereby incorporated by reference in their entirety herein, especially with respect to the disclosure of structures, synthetic techniques and general knowledge in the art. The term "comprising" when used herein with respect to a composition or mixture is not intended to exclude the additional presence of any other compound or component. The term "aromatic" or "aryl" refers to a polyatomic, cyclic, ring system containing $(4\delta+2)$ π-electrons, wherein δ is an integer greater than or equal to 1.

Throughout this specification and claims, the phrase "moist mass comprising the solid procatalyst," denotes a mass of solid material and liquid material, whereby the amount of liquid present is preferably greater than about 10 percent by weight, and preferably less than about 20 percent by weight, based on the total weight of the mass. The moist mass preferably is the filter cake remaining on the filter after the solid procatalyst is separated from the reaction medium used in its preparation. The expression "moist mass" indicates that the solid mass has not been dried by passing hot air or nitrogen through the mass, vacuum drying, or by other means of drying a moist mass. Unless stated to the contrary or customary in the art, all parts and percents are based on weight.

As mentioned above, the olefin polymerization procatalyst precursors employed in the invention comprise a magnesium compound. Examples include anhydrous magnesium chloride, magnesium dialkoxides, or carboxylated magnesium dialkoxides. A preferred magnesium compound is diethoxymagnesium. Additional components, especially titanium compounds, may be present as well. Preferred precursors comprise one or more magnesium compounds and one or more titanium compounds, especially mixed magnesium- and titanium-alkoxide, aryloxide, or halide compounds. Various methods of making procatalyst precursor compounds are known in the art. These methods are described, inter alia, in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; and 5,247,032. In particular, the preparation may be aided by use of one or more compounds, referred to as "clipping agents", that aid in forming specific compositions. Examples of suitable clipping agents include trialkylborates, especially triethylborate, phenolic compounds and silanes.

A preferred procatalyst precursor for use herein is a mixed magnesium/titanium compound of the formula $Mg_d Ti(OR^e)_e X_f (ED)_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; ED is an electron donor; d is 1-36, preferably 1-10, most preferably 2-6; e is 0-12, preferably 1-10, most preferably 2-10; f is 1-40, preferably 1-10, most preferably 1-6; and g is 0.1-3 preferably 0.5-2.5, most preferably 1-2.

The foregoing mixed magnesium/titanium compound and optional electron donor are converted to a solid procatalyst by further reaction with a titanium halide compound. Suitable titanium halides have the formula $Ti(OR^e)_j X_h$ wherein $R^e$ and X are as defined above; j is 0, 1 or 2, h is an integer from 1 to 4; and j+h is 3 or 4. If not already incorporated into the precursor in sufficient quantity, the electron donor may be added separately before, during or after reaction with the titanium halide compound. Any method of making, recovering and storing the solid precursor is suitable for use in the present invention.

One suitable method for converting the procatalyst precursor into a polymerization procatalyst is by reacting the precursor with the titanium halide, an optional hydrocarbon or halohydrocarbon, and an electron donor (if not already present). A preferred titanium halide is titanium tetrachloride.

The optional hydrocarbon or halohydrocarbon employed in the production of olefin polymerization procatalyst preferably contains up to 12 carbon atoms inclusive, more preferably up to 9 carbon atoms inclusive. Exemplary hydrocarbons include pentane, octane, benzene, toluene, xylene, alkylbenzenes, and the like. Exemplary aliphatic halohydrocarbons include methylene chloride, methylene bromide, chloroform carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene is particularly preferred.

Any electron donor can be used in the present invention so long as it is capable of converting the precursor into a procatalyst. Suitable electron donors are those electron donors free from active hydrogens that are conventionally employed in the formation of titanium-based procatalysts. Particularly preferred electron donors include ethers, esters, amines, imines, nitriles, phosphines, stibines, and arsines. The more preferred electron donors, however are carboxylic acid esters or ether derivatives thereof, particularly alkyl esters of aromatic monocarboxylic or dicarboxylic acids and ether derivative thereof. Examples of such electron donors are methylbenzoate, ethylbenzoate, ethyl p-ethoxybenzoate, ethyl p-methoxybenzoate, diethylphthalate, dimethylnaphthalenedicarboxylate, diisobutylphthalate (DIBP), diisopropyl terephthalate. The electron donor can be a single compound or a mixture of compounds, but preferably the electron donor is a single compound. Of the preferred ester electron donors, ethylbenzoate, ethyl p-ethoxybenzoate, and diisobutylphthalate are particularly preferred.

The manner in which the procatalyst precursor, the optional hydrocarbon or halohydrocarbon and the electron donor are contacted is not critical. In one embodiment, the titanium halide is added to a mixture of the electron donor and procatalyst precursor. More preferably, however, the electron donor first is mixed with the tetravalent titanium halide and optional halohydrocarbon and the resulting mixture is used to contact the procatalyst precursor. Other procedures also are suitable if desired.

The solid product that results may be further halogenated by contact with a further quantity of titanium halide compound, if desired, and in addition a halohydrocarbon. The two procedures may be combined or employed separately. Moreover, it often is useful to also include an acid chloride, such as benzoyl chloride or phthaloyl chloride, separately or in combination with the foregoing post treatments, to further facilitate the replacement of alkoxide moieties with halide moieties. This replacement or halogenation, is well known in the art and skilled artisans are capable of carrying out such a replacement using well known techniques.

In a preferred embodiment, the mixture of procatalyst precursor, titanium halide, electron donor and optional halohydrocarbon is maintained at an elevated temperature, for example, a temperature of up to about 150° C., for a period of time. Best results are obtained if the materials are contacted initially at or about ambient temperature and then heated. Sufficient titanium halide is provided to convert at least a portion and preferably at least a substantial portion of the alkoxide moieties of the procatalyst precursor to halide groups. This replacement is conducted in one or more contacting operations, each of which is conducted over a period of time ranging from a few minutes to a few hours and it is preferred to have a halohydrocarbon present during each contacting. Sufficient electron donor usually is provided so that the molar ratio of electron donor to the magnesium present in the solid procatalyst precursor is from about 0.01:1 to about 3:1, preferably from about 0.05:1 to about 2.0:1.

After formation of the solid procatalyst, including the foregoing replacement post-treatment, the solid procatalyst material is separated from the reaction medium, preferably by filtering to produce a moist filter cake. The moist filter cake desirably is then rinsed to remove unreacted titanium halide and may be dried to remove residual liquid, if desired. The moist, rinsed filter cake comprising the solid procatalyst is then extracted one or more times, as previously disclosed, to reduce titanium content of the final procatalyst.

The extraction involves contacting the moist mass comprising the procatalyst, preferably a filter cake, with a liquid diluent and increasing the temperature of the mixture to above room temperature. In contrast, washing or rinsing procedures do not employ elevated temperatures. The particular liquid diluent employed, the ultimate temperature to which the mixture is raised, and the period of time in which the mixture is held at the elevated temperature are selected such that the final solid procatalyst produced has a titanium moiety content lower than the total titanium moiety content of the solid procatalyst material present in the solid procatalyst prior to the extraction. Thereafter, the solid procatalyst and extracting liquid are separated. It is particularly preferred to contact the mixture at a temperature greater than 45° C., preferably greater than 85° C., more preferably greater than 115° C., and most preferably greater than 120° C. to about 300° C., more preferably to about 200° C., and most preferably to about 150° C.

An alternative embodiment of the invention contemplates separating the solid procatalyst material from the reaction medium and drying the material prior to the foregoing extraction procedure. The dried material then is contacted with the liquid diluent as before disclosed, and the mixture is heated to an elevated temperature. In this embodiment of the invention, the temperature preferably is above about 115° C., preferably above about 120° C., and even more preferably above 125° C. It is even more preferred that the temperature be above about 125° C. and below about 200° C.

It is preferred in the present invention to use as an extractant the same diluent that was used in the conversion of the precursor to the solid procatalyst. Preferred extractants include aliphatic, cycloaliphatic, or aromatic hydrocarbons, halogenated derivatives thereof, and mixtures thereof. Exemplary aliphatic hydrocarbons include pentane, octane and the like. Exemplary cycloaliphatic hydrocarbons include cyclopentane, cyclohexane, cyclooctane, and the like. Exemplary aromatic hydrocarbons include benzene, alkylbenzenes, dialkylbenzenes, and the like. Exemplary halogenated derivatives of the foregoing include methylenechloride, methylenebromide, chloroform, carbon tetrachloride, 1,2-dibromoethane, 1,1,2-trichloroethane, trichliorocyclohexane, dichlorofluoromethane, tetrachlorooctane, chlorobenzene, bromobenzene, dichlorobenzene, chlorotoluene, and the like. Particularly preferred aliphatic hydrocarbons include pentane, isopentane, octane, and isooctane. Particularly preferred aromatic hydrocarbons include benzene, toluene, and xylene. Particularly preferred halohydrocarbons include carbon tetrachloride, 1,1,2-trichloroethane and chlorinated benzenes. Most highly preferred extractants are aromatic hydrocarbons and halohydrocarbons, especially toluene, xylene, ethylbenzene, chlorobenzene and dichlorobenzene. Desirably the extractant selected has a boiling point equal to or above the temperature used in the extraction so as to avoid the use of high pressure equipment.

The amount of extractant employed can be any effective amount capable of removing titanium species from the solid procatalyst. It is preferred that the extractant be used in an amount ranging from 0.1 to about 1000 milliliters per gram of solid procatalyst material. More preferably, the amount of extractant used ranges from about 1 to about 500 mL/g of solid procatalyst, and most preferably from about 5 to about 50 mL/g of solid procatalyst.

The amount of time the solid procatalyst material and the extractant are contacted is not critical so long as it is sufficient to remove titanium species from the solid procatalyst material. There is no upper limit on the duration of contact from an efficacy standpoint, but economics typically play a role on the length of time the components will be contacted with one another. Preferably, the components are contacted from about 2 minutes to about 3 days, more preferably from about 5 minutes to about 1 day, and most preferably, from about 15 minutes to about 2 hours. Longer contact times and/or repeated extractions may be required if lower extraction temperatures or less efficient extractants are employed. The extraction may be conducted at any suitable pressure, but preferably atmospheric pressure or elevated pressures are employed.

Typically unextracted, solid, procatalysts have a titanium content anywhere from about 2.5 percent to about 6 percent, as determined by plasma emission spectroscopy. The extracted, solid procatalyst of the present invention, however, preferably has up to 75 weight percent less titanium content, more preferably up to 50 weight percent less titanium, and most preferably, anywhere from about 5 to about 75 weight percent less titanium content. The extraction may be repeated any number of times in order to achieve the desired titanium content of the solid procatalyst.

After extraction according to the present invention, the liquid diluent containing extracted titanium species and solid procatalyst are separated, generally by filtering. The solid procatalyst may be washed with a liquid other than the liquid diluent employed in the extraction or at conditions designed to not remove further quantities of titanium compound in order to remove the extractant. Typically the extracted, solid procatalyst is washed one or more times with an aliphatic hydrocarbon such as isopentane, isooctane, isohexane, hexane, pentane, or octane. The solid procatalyst component then can be separated and dried or slurried in a hydrocarbon, especially a relatively heavy hydrocarbon such as mineral oil. The resulting extracted, solid procatalyst is desirably in the form of porous, particles. The extracted, solid, procatalyst suitably has a titanium content of from about 0.15 percent by weight to about 3.00 percent by weight, based on the total solids weight of the procatalyst, preferably from about 0.6 percent by weight to about 2.0 percent by weight, and most preferably from about 0.75 percent by weight to about 1.85 percent by weight. The weight ratio of titanium to magnesium in the extracted, solid, procatalyst is suitably between about 1:12 and about 1:350, preferably between about 1:20 and about 1:80, and most preferably between about 1:22 and 1:65. The internal electron donor is present in the extracted, solid procatalyst in a ratio of internal electron donor to magnesium of from about 0.005:1 to about 1:1, preferably from about 0.04:1 to about 0.4:1.

One ordinarily would expect that reducing the titanium content of a procatalyst would adversely affect the activity of the ultimate catalyst. While some reduction of activity may in fact occur, surprisingly, depending on other polymerization variables, catalyst activity is often comparable or even higher than that of catalysts prepared from unextracted solid procatalysts. Moreover, it has been discovered that catalysts obtained from extracted, solid procatalysts according to the present invention are capable of producing olefin polymers, especially polymers comprising one or more $C_{3-8}$ α-olefins, and especially propylene, having dramatically reduced xylene solubles content (XS). That is, the ultimate polymer produced has a much lower percentage of undesired atactic polymer. It is preferred that the procatalyst result in a catalyst that produces propylene homopolymer having greater than a 25 percent reduction in xylene solubles when compared to a propylene homopolymer produced by an otherwise identical catalyst made from the unextracted procatalyst. More preferably, the polymer has more than a 30 percent reduction, and most preferably more than a 50 percent reduction in xylene solubles level. These benefits as well as additional benefits are attained according to the present invention. The reason for achieving such benefits may be the result of changed physical or chemical properties of the solid procatalysts, such as change in surface area or preferential removal of a specific, detrimental form of titanium compound, rather than actual decrease in titanium content, although measurement of such decrease in titanium value accurately measures the degree of change to the extracted solid, procatalyst composition achieved by the invented process.

The polymer produced utilizing catalysts formed from the procatalyst compositions of the present invention is also stiffer (has higher flexural modulus) as a consequence of its lower xylene soluble content. It is preferred that the procatalyst of the invention results in a catalyst that produces a polymer having greater than a 5 percent increase in flexural modulus measured according to ASTM D-790, when compared to a polymer produced by an otherwise identical catalyst made from the unextracted procatalyst. More preferably, the polymer has more than a 10 percent increase, and most preferably more than a 15 percent increase in flexural modulus. Most highly preferably the polymer is polypropylene.

In addition, the polymer product according to the present invention preferably has higher bulk density when compared to polymer produced by use of an otherwise identical catalyst prepared from unextracted solid procatalyst. Higher bulk density can lead to increase in manufacturing rate. It is preferred that the extracted solid procatalyst achieve a catalyst that produces polymer having greater than a 5 percent increase in bulk density when compared to a polymer produced by an otherwise identical catalyst made from unextracted procatalyst. More preferably, the polymer has more than a 10 percent increase, and most preferably more than a 15 percent increase in bulk density.

Catalysts formed from the extracted, procatalysts of the invention also preferably use less hydrogen to produce a polymer at a given melt flow. Accordingly, such catalysts are believed to be more hydrogen responsive. A catalyst that is more hydrogen responsive can make a broader range of products. It is preferred that catalyst formed from the present procatalyst achieve an equivalent performance with at least a 5 percent reduction in hydrogen usage, more preferably at least a 10 percent reduction in hydrogen usage, when compared to an otherwise identical catalyst made from unextracted, solid procatalyst under the same polymerization conditions.

Additionally, catalysts prepared from extracted, solid procatalysts according to the present invention also preferably produce polymers containing a lower level of oligomers, which are undesired by-products of the polymerization. It is preferred that catalysts prepared from extracted solid, procatalysts according to the invention produce polymers having greater than a 5 percent reduction in oligomer content when compared to a polymer produced by an otherwise identical catalyst made from unextracted, solid procatalyst. More preferably, the polymer has more than a 10 percent reduction, and most preferably more than a 15 percent reduction in oligomer levels.

Finally, in a preferred embodiment, catalysts prepared from extracted procatalysts according to this invention generally possess higher productivity, based on either titanium weight or total catalyst weight, compared to catalysts prepared from unextracted, solid procatalysts. It is preferred that catalysts according to the present invention have at least a 10 percent increase in productivity, more preferably, at least a 15 percent increase, and most preferably at least a 20 percent increase in productivity, compared to catalysts prepared from unextracted, solid procatalysts.

In a preferred embodiment of the invention, the extraction may be coupled with a substitution reaction using a halide salt compound simultaneously with or prior to the present extraction. Suitable halide compounds include those compounds that are capable of removing titanium species from the solid procatalyst material without detrimentally affecting the resulting catalyst properties. It is preferred that the halide salt compound be soluble in the medium that contains the procatalyst or the precursor components. The halide salt compound (if different from the titanium halide compound used to prepare the present solid, procatalyst) may be employed by itself, or it may be complexed with another compound, such as an internal electron donor.

More than one halide salt compound may be used in the foregoing substitution if desired. If complexed halide salts are employed, it is desirable that $TiCl_4$ or other uncomplexed halide salt is also present in the substitution mixture. The foregoing substitution step may be combined with the present extraction procedure, if desired. However, when combining such a substitution using $TiCl_4$ as one of the halide salt compounds with the present extraction process, care must be exercised to employ conditions that result in extraction of titanium species from the solid procatalyst. That is, the quantity of $TiCl_4$ employed in the combination extraction-substitution should be less than that which is present at equilibrium, such that net removal of titanium species from the solid procatalyst occurs. Preferably, the quantity of $TiCl_4$ present in the extracting or extracting/substitution liquid is less than 3 percent, more preferably less than 1 percent, most preferably less than 0.5 percent, based on the weight of the extractant- or extraction/substitution liquid. The presence of a small quantity of $TiCl_4$ in the substitution medium has desirably been found to reduce adverse affects caused by release of electron donor from the procatalyst during the substitution.

Suitable halide salt compounds for the foregoing substitution procedure include: $TiCl_4$, $ZrCl^4$, $VCl_4$, $WCl_6$, $VOCl_3$, SnCl₄, SiCl₄ dicyclopentyldichlorosilane, and mixtures thereof. Soluble complexes of such metal halides complexed with the appropriate ligands, such as diisobutyl phthalate (DIBP), also may be used. Examples include $ZrCl_4(DIBP)$ and $VCl_1(DIBP)$.

The extracted and optionally substituted, solid, procatalyst serves as one component of a Ziegler-Natta catalyst composition, in combination with a cocatalyst and a selectivity control agent. The cocatalyst component employed in the Ziegler-Natta catalyst system may be chosen from any of the known activators of olefin polymerization catalyst systems employing a titanium halide, especially organoaluminum compounds. Examples include trialkylaluminum compounds, alkylaluminum alkoxide compounds, and alkylaluminum halide compounds. Preferred are those compounds of the foregoing list in which each alkyl independently has from 1 to 6 carbon atoms inclusive. The preferred organoaluminum cocatalysts are halide free and particularly preferred are the trialkylaluminum compounds such as those wherein each of the alkyl groups, independently contain from 1 to 6 carbon atoms.

Preferred trialkylaluminum cocatalysts are triethylaluminum, triisopropylaluminum, triisobutylaluminum and diethylhexylaluminum. Triethylaluminum is a most preferred cocatalyst. The organoaluminum cocatalyst is preferably employed in a molar ratio of aluminum to titanium of the procatalyst of from about 1:1 to about 150:1, but more preferably in a molar ratio of from about 10:1 to about 100:1.

The final component of the Ziegler-Natta catalyst composition is the selectivity control agent (SCA), or external electron donor. Typical SCAs are those conventionally employed in conjunction with titanium-based Ziegler-Natta catalysts. Illustrative of suitable selectivity control agents are those classes of electron donors employed in procatalyst production as described above, as well as organosilane compounds containing at least one silicon-oxygen-carbon linkage. Suitable silicon compounds include those of the formula, $R^1_m SiY_n X_p$, wherein: $R^1$ is a hydrocarbon radical containing from 1 to 20 carbon atoms, Y is $—OR^2$ or $—OCOR^2$ wherein $R^2$ is a hydrocarbon radical containing from 1 to 20 carbon atoms, X is hydrogen or halogen, m is an integer having a value of from 0 to 3, n is an integer having a value of from 1 to 4, p is an integer having a value of from 0 to 3, and preferably 0, and m+n+p=4. $R^1$ should be such that there is at least one non-primary carbon in the alkyl and preferably, that such non-primary carbon is attached directly to the silicon atom. Examples of $R^1$ include cyclopentyl, t-butyl, isopropyl or cyclohexyl. Examples of $R^2$ include ethyl, butyl, isopropyl, phenyl, benzyl and t-butyl. Examples of X are Cl and H.

Each $R^1$ and $R^2$ may be the same or different, and, if a polyatomic radical, substituted with any substituent which is inert under the reaction conditions employed during polymerization. Preferably, $R^2$ contains from 1 to 10 carbon atoms when it is aliphatic and may be a sterically hindered aliphatic- or a cycloaliphatic-group. When $R^2$ is aromatic it may have from 6 to 10 carbon atoms. Silicon compounds in which two or more silicon atoms are linked to each other by an oxygen atom, such as, siloxanes or polysiloxanes, may also be employed, provided the requisite silicon-oxygen-carbon linkage is also present. The preferred selectivity control agents are alkylalkoxysilanes such as ethyldiethoxysilane, diisobutyldimethoxysilane, cyclohexylmethyldimethoxysilane, n-propyltrimethoxysilane and dicyclopentyldimethoxysilane; alkyl diesters of dicarboxylic acids, such as diethylphthalate,or diisobutyl phthalate; and alkyl ethers of aromatic carboxylic acid esters or alkyl ethers of aromatic dicarboxylic acid diesters, such as ethyl p-methoxybenzoate or ethyl p-ethoxybenzoate. In one embodiment of the invention the foregoing selectivity control agent may form at least a portion of the electron donor added during procatalyst production. In an alternate modification the selectivity control agent is added only after formation of the procatalyst and may be added simultaneously or non-simultaneously with addition of the cocatalyst.

Because catalysts prepared from the extracted, solid procatalyst of the present invention are more stereoselective than those prepared from an otherwise identical, non-extracted, solid procatalyst, a lower level of SCA is required than when employing conventional procatalysts. It is preferred that the amount of SCA can be reduced by more than 20 percent, more preferably, the amount is reduced by more than 30 percent, and most preferably, it is reduced by more than about 50 percent up to about 99 percent. The reduction in amount of SCA is based on the amount of SCA that would be required when using an otherwise identical but non-extracted, procatalyst. This reduction in SCA usage can result in significant savings in particular if an expensive SCA, like dicyclopentyldimethoxysilane (DCPDMS) is used. The selectivity control agent preferably is provided in a quantity of from 0.01 mole to about 100 moles per mole of titanium in the procatalyst. Preferred quantities of selectivity control agent are from about 0.5 mole to about 50 mole per mole of titanium in the procatalyst.

The olefin polymerization catalyst is produced by any suitable procedure of contacting the extracted, solid procatalyst, the cocatalyst and the selectivity control agent. The method of contacting is not critical. The catalyst components or combinations thereof can be precontacted prior to polymerization to form a preactivated catalyst, or the components can be contacted simultaneously with contact with an olefin monomer. In one modification, the catalyst components simply are mixed in a suitable vessel and the preformed catalyst thereby produced is introduced into the polymerization reactor when initiation of polymerization is desired. In an alternate modification, the catalyst components are introduced into the polymerization reactor and the catalyst is formed in situ. In a final embodiment, the catalyst components may be introduced into one polymerization reactor and prepolymerized with one or more olefin monomers and subsequently contacted with additional olefin monomers, which may be the same or different from the olefin monomers used in the prepolymerization. The subsequent polymerization may take place in the same or in a different polymerization reactor.

The olefin polymerization catalyst may be used in slurry, liquid phase, gas phase or bulk, liquid monomer-type polymerization processes as are known in the art for polymerizing olefins, or in a combination of such processes. Polymerization preferably is conducted in a fluidized bed polymerization reactor, however, by continuously contacting an alpha-olefin having 3 to 8 carbon atoms with the three components of the catalyst system, that is, the solid procatalyst, cocatalyst and SCAs. In accordance with the process, discrete portions of the catalyst components are continuously or semi-continuously fed to the reactor in catalytically effective amounts together with the alpha-olefin and any additional components, while the polymer product is continuously or semi-continuously removed therefrom. Fluidized bed reactors suitable for continuously polymerizing alpha-olefins have been previously described and are well known in the art. Suitable fluidized bed reactors useful for this purpose are described in U.S. Pat. Nos. 4,302,565, 4,302,566 and 4,303,771 and elsewhere.

It is preferred sometimes that such fluidized beds are operated using a recycle stream of unreacted monomer from the fluidized bed reactor. In this context, it is preferred to condense at least a portion of the recycle stream. Additionally, a liquid condensing agent may be included in the reaction mixture as well. The foregoing procedures are referred to as "condensing mode." Operating a fluidized bed reactor in condensing mode generally is known in the art and described in, U.S. Pat. No. 4,543,399 and U.S. Pat. No. 4,588,790, and elsewhere. The use of condensing mode has been found to be especially useful to increase catalyst activity, lower the amount of xylene solubles in isotactic polypropylene, and to improve overall catalyst performance when using catalysts prepared according to the present invention.

The precise procedures and conditions of the polymerization are broadly conventional but the olefin polymerization process, by virtue of the use therein of the polymerization catalyst formed from extracted, solid procatalysts of the invention, provides a polyolefin product and particularly a polypropylene product having a relatively high bulk density in an amount that reflects the relatively high productivity of the olefin polymerization catalyst. Moreover, the polyolefin product of the invention has a reduced xylene solubles content when compared to a polyolefin made by a catalyst made from an unextracted, but otherwise similar procatalyst.

The xylene solubles content of the polyolefin products of the invention preferably are less than 5 weight percent, more preferably less than 2.5 weight percent, and most preferably lower than 1.75 weight percent. In addition, the polyolefin product preferably will contain reduced amounts of the catalyst residue. Preferably, the polymer will have a titanium content of less than about $1\times10^{-3}$ weight percent, more preferably less than $1\times10^{-4}$ weight percent, most preferably less than $5\times10^{-5}$ weight percent.

When DCPDMS is used as SCA, the polyolefin products of the invention preferably possess flexural modulus of at least 265,000 psi (1,830 MPa), preferably at least 275,000 psi (1,900 MPa), and most preferably at least 280,000 psi (1,930 MPa).

The polymerization product of the present invention can be any product, homopolymer, copolymer, terpolymer, and the like. Usually, the polymerization product is a homopolymer such as polyethylene or polypropylene, particularly polypropylene. Alternatively, the catalyst and process of the invention are useful in the production of copolymers including copolymers of ethylene and propylene such as EPR and polypropylene impact copolymers when two or more olefin monomers are supplied to the polymerization process. Those skilled in the art are capable of carrying out suitable polymerization of homopolymers, copolymers, terpolymers, or other product using liquid, slurry or gas phase reaction conditions, using the guidelines provided herein.

The invention is further illustrated by the following Examples that should not be regarded as limiting of the present invention.

EXAMPLES

In the following examples, the following testing methods were used to determine the values reported in the tables. In the tables, a blank cell indicates that no data were taken for that particular portion of the experiment.

Ti percent—percent titanium was determined by analyzing the catalysts using plasma emission spectroscopy.

Melt Flow was determined using ASTM 1238, Condition L;

Bulk Density was determined using ASTM D1895;

XS—xylene solubles, unless indicated otherwise was measured by the $^1$H NMR method as described in U.S. Pat. No. 5,539,309, or the gravimetric XS method of 21 CFR 177.1520.

C15, C21—oligomer content was measured by extracting a polymer sample overnight in a chloroform solution containing n-hexadecane as an internal standard. An aliquot of the extract was shaken with methanol and then filtered to remove any precipitated high molecular weight polypropylene and solid particles. The filtered liquid was then injected onto a fused silica capillary chromatography column using cold on-column injection. Relative amounts of the extracted components were calculated based on the weight of polymer extracted.

Modulus is flexural modulus, measured on aged (3 weeks), injection molded samples according to ASTM D790A.

Polymerization Conditions:

(1) Polymerization Procedure (A): Liquid Propylene Stirred Polymerization Procedure Liquid propylene (2.7 L) was added to a cooled 1-gallon autoclave that had been dried under a stream of nitrogen at greater than 90° C. The stirred autoclave was maintained at a temperature of 62° C., and then hydrogen, SCA, 5.0 percent by weight triethylaluminum (TEAL) solution in heptane, and procatalyst as a 5 percent by weight mineral oil slurry were added. The polymerization conditions are maintained for 60 minutes at 67° C.

(2) Polymerization Procedure (B): Gas Phase Polymerization Procedure

Gas-phase propylene polymerization was carried out in a 14-inch fluidized bed reactor. The reactor was equipped with a distributor plate under which the fluidization gas was introduced. The gas exited the top of the fluidized bed and was conveyed through piping to a compressor and a cooler, which was used to control the temperature of the cycle gas, thereby controlling the temperature in the fluidized bed. After cooling, the cycle gas was then reintroduced below the distributor plate. Monomer and hydrogen were fed separately to the cycle pipe.

The fluidized-bed reactor was operated under 415 (psig) (3.0 MPa) of total pressure with a propylene partial pressure of 300 psig (2 MPa). A superficial gas velocity of 1.3 to 1.4 ft/sec (0.43 m/sec) was used to fluidize 83 lbs (38 Kg) of polymer. Production rates ranged from 21 to 38 lbs/hr (9.5 to 17 kg/hr).

The procatalyst slurry was metered with a syringe pump into a stream of propylene flowing at 5 lbs/hr (2.3 kg/hr), which conveyed the procatalyst into the reactor. Solutions of TEAL and SCA were introduced separately into the reactor at separate locations.

Comparative Example A

Procatalyst A was made according to U.S. Pat. No. 5,093, 415. Accordingly, Mg(OEt)$_2$ was slurried in a 50/50 (vol/vol) mixture of TiCl$_4$/MCB (monochlorobenzene) (20 liter/kilogram Mg(OEt)$_2$) with DIBP (diisobutyl phthalate) (0.3 liter/kilogram Mg(OEt)$_2$). After the mixture was heated at 106° C. for 60 minutes, it was filtered. The resulting moist mass was slurried in a 50/50 (by volume) TiCl$_4$/MCB mixture (20 liter/kilogram Mg(OEt)$_2$) at 106° C. for 30 minutes, filtered, and the process repeated one more time. The resulting solid was rinsed with isopentane and then dried with flowing warm nitrogen. The resulting procatalyst contained 2.70 percent Ti by weight.

Procatalyst A (10.0 grams of dry powder) was slurried in 100 mL of anhydrous toluene at 100° C. for 60 minutes and then filtered to remove solvent. This extraction procedure, using 10 mL toluene/g procatalyst, was repeated six times for varying time periods, and after each extraction some of the resulting solid procatalyst material was washed with pentane three times at room temperature to remove residual solvent and dried under vacuum. The solid procatalyst component was then measured for Ti content. The results are shown in Table 1 below.

TABLE 1

| procatalyst | Treatment | Ti (percent) |
|---|---|---|
| A | Standard Catalyst | 2.70 |
| A1 | A contacted with toluene, 100° C., 1 h | 2.56 |
| A2 | A1 contacted with toluene, 100° C., 1 h | 2.44 |
| A3 | A2 contacted with toluene, 100° C., 1 h | 2.42 |
| A4 | A3 contacted with toluene, 100° C., 1 h | 2.31 |
| A5 | A4 contacted with toluene, 100° C., 1 h | 2.27 |
| A6 | A5 contacted with toluene, 100° C., 3 h | 2.07 |
| A7 | A6 contacted with toluene, 100° C., 24 h | 1.87 |

As seen from the above Table 1, a number of successive contact procedures are required to reduce the titanium content in the procatalyst to any appreciable degree. Indeed, it wasn't until the final procatalyst was extracted for 24 hours at 100° C. that the titanium content finally dropped below 2 percent.

Example B

A series of procatalysts were prepared by extractions at various temperatures, using a varying amount of monochlorobenzene solvent, excepting for Example B21 where the solvent used was o-xylene. The starting material, amount of solvent, and the temperature of each extraction are shown in Table 2 below.

TABLE 2

| Procatalyst | starting material | contact temp. and duration | solvent usage (mL/g procat.) | Ti (percent by weight) |
|---|---|---|---|---|
| A | | none | | 2.70 |
| B1 | A | 130° C., 1 h | 15.0 | 1.35 |
| B2 | B1 | 130° C., 1 h | 15.0 | 1.01 |
| B3 | B2 | 130° C., 4 h | 15.0 | 0.79 |
| B4 | B3 | 130° C., 16 h | 15.0 | 0.90 |
| B5 | A | 130° C., 1 h | 50.0 | 1.50 |
| B6 | B5 | 130° C., 1 h | 50.0 | 1.02 |
| B7 | B6 | 130° C., 4 h | 50.0 | 1.02 |
| B8 | A | 115° C., 1 h | 32.5 | 1.85 |
| B9 | B8 | 115° C., 1 h | 32.5 | 1.32 |
| B10 | B9 | 115° C., 4 h | 32.5 | 1.03 |
| B11 | B10 | 115° C., 16 h | 32.5 | 0.87 |
| B12 | A | 100° C., 1 h | 50.0 | 2.40 |
| B13 | B12 | 100° C., 1 h | 50.0 | 2.18 |
| B14 | B13 | 100° C., 4 h | 50.0 | 2.06 |
| B15 | B14 | 100° C., 16 h | 50.0 | 1.61 |
| B16 | A | 100° C., 1 h | 15.0 | 2.46 |
| B17 | B16 | 100° C., 1 h | 15.0 | 1.93 |
| B18 | B17 | 100° C., 4 h | 15.0 | 1.90 |
| B19 | B18 | 100° C., 16 h | 15.0 | 1.48 |
| A | | none | | 3.01 |
| B20 | A | 130° C., 1 h | 10.0 | 1.12 |
| B21 | B20 | 130° C., 1 h | 10.0 | 1.76 |

As can be seen from the above table, contacting the procatalyst with a solvent at a temperature above about 100° C. provides a greater removal of titanium. In each of the series using a 100° C. solvent contact, it took a number of successive extractions to bring the titanium level to below 2.0. In contrast, at 130° C. only one extraction was required to reduce the amount of titanium by ½ the original amount.

Example C

As a control, approximately 2.2 g of Mg(OEt)$_2$ was slurried in a volume of 55 mL of a 50/50 (vol/vol) mixture of TiCl$_4$/MCB with 0.74 mL of DIBP at 110° C. for 60 minutes. The resulting mixture was filtered while hot. The recovered solids were slurried in 55 mL of fresh 50/50 TiCl$_4$/MCB mixture at 110° C. for 60 minutes. The resulting mixture was filtered while hot. The recovered solids were chlorinated by slurrying again in 55 ML of fresh 50/50 TiCl$_4$/MCB mixture at 110° C. for 30 minutes. The resulting mixture was filtered while hot and the solids recovered. The solids were rinsed three times with 70 mL of iso-octane at room temperature to produce a moist mass containing a solid catalyst component, and then dried for at least two hours under flowing nitrogen. The Ti content of the procatalyst thus obtained, designated by the letter C in Table 3 below, was 2.70 percent by weight.

The method of making the procatalyst C above was modified by adding an extraction step. About 2.2 g of Mg(OEt)$_2$ was slurried in a volume of 55 mL of a 50/50 (vol/vol) mixture of TiCl$_4$/MCB with 0.74 mL of DIBP at 110° C. for 60 minutes. The resulting mixture was filtered while hot. The recovered solids were slurried in 55 mL of fresh 50/50 TiCl$_4$/MCB mixture at 110° C. for 60 minutes. The resulting mixture was filtered while hot. The recovered solids were slurried again in 55 mL of fresh 50/50 TiCl$_4$/MCB mixture at 110° C. for 30 minutes. The resulting mixture was filtered while hot and the solids rinsed with 70 mL of MCB at room temperature to prepare a moist mass containing a solid procatalyst material. The moist mass then was extracted by slurrying with 70 mL of MCB at 110° C. for 60 minutes. The mixture was filtered while hot. The solids were rinsed three times with 70 mL of iso-octane at room temperature, and then dried for at least two hours under flowing nitrogen. The Ti content of the procatalyst thus obtained, designated by the letter C1 in the table below, was 1.80 percent by weight.

The procedure for preparing procatalyst C1 above was repeated, except that the slurring with MCB at 110° C. and the subsequent filtration was repeated once. The Ti content of the procatalyst, designated by the letter C2 was 1.10 percent.

The procedure for preparing procatalyst C1 above was repeated, except that the slurring with MCB at 110° C. and the following filtration was repeated twice. The Ti content of the procatalyst, designated by the letter C3, was 1.00 percent. The results of the analyses for catalysts C-C3 in this example are shown in Table 3 below.

TABLE 3

| Procatalyst | Treatment | Ti (percent) |
|---|---|---|
| C | none | 2.7 |
| C1 | contact w/MCB, 110° C., 1x | 1.8 |
| C2 | contact w/MCB, 110° C., 2x | 1.1 |
| C3 | contact w/MCB, 110° C., 3x | 1.0 |

Polymerizations

The procatalysts as prepared in comparative examples A, B and C above were used to polymerize propylene in accordance with polymerization procedure (A). DCPDMS was used as the SCA. The results of the polymerizations are shown in Table 4 below.

TABLE 4

| Run | Procat. | Ti (percent) | PP g/μg Ti | MF | XS (percent) | Modulus kpsi (MPa) |
|---|---|---|---|---|---|---|
| 1* | A | 2.70 | 0.82 | 5.29 | 1.6 | — |
| 2 | A1 | 2.56 | 0.99 | 0.70 | 1.1 | — |
| 3 | A2 | 2.44 | 0.84 | 0.27 | 1.6 | — |
| 4 | A3 | 2.42 | 0.94 | 2.04 | 1.1 | — |
| 5 | A4 | 2.31 | 1.2 | 3.14 | 1.3 | 284 (1,960) |
| 6 | A5 | 2.27 | 1.11 | 1.21 | 1.1 | — |
| 7 | A6 | 2.07 | 1.01 | 0.49 | 1.0 | — |
| 8 | A7 | 1.87 | 1.23 | 3.51 | 0.7 | 287 (1,980) |
| 9* | C | 2.7 | 0.96 | 0.7 | 1.8 | — |
| 10 | C1 | 1.8 | 1.14 | 0.49 | 1.7 | — |
| 11 | C2 | 1.1 | 1.2 | 1.56 | 1.0 | 266 (1,830) |
| 12 | C3 | 1.0 | 1.6 | 3.0 | 0.6 | 279 (1,920) |

*Comparative, not an example of the invention

As can be seen from the table above, the activity of the catalyst of the invention increases on a per gram Ti basis, even though the catalyst contains less titanium. Accordingly, each gram of titanium is making more polypropylene. In addition, as the amount of titanium is decreased, the xylene solubles is significantly decreased, and the flexural modulus of the resulting polymer is increased.

Examples 1-17

The following set of examples, the results of which are shown in Table 5 below, illustrate the advantageous properties achieved when a variety of different procatalysts were subjected to treatment in accordance with the invention, when compared to the same procatalysts that were not subjected to such treatment. The procatalysts were then used to polymerize propylene using polymerization procedure (A) and varying SCA/Ti ratios. Specific procatalysts, if not previously disclosed, were prepared as follows:

Example 3 (Comparative)

Procatalyst D was made according to U.S. Pat. No. 5,652, 314.

Accordingly, a carbonated magnesium diethoxide precursor with $SiO_2$ filler was slurried in a 50/50 (vol/vol) mixture of $TiCl_4$/MCB (13 liters mixture/kilogram precursor) with DIBP (0.2 liter/kilogram precursor). After the mixture was heated at 110° C. for 60 minutes, it was filtered. The resulting moist mass was slurried in a 50/50 $TiCl_4$/MCB mixture (13 liter/kilogram precursor) at 110° C. for 60 minutes and then filtered. This process was repeated once for 30 minutes instead of 60 minutes. The resulting solid was rinsed with isopentane and then dried with flowing warm nitrogen. The resulting procatalyst contained 2.55 percent Ti by weight, and was not further treated prior to use.

Example 5

Approximately 400 mL of 30 percent by weight slurry of procatalyst D in mineral oil was washed with 500 mL of iso-octane at room temperature to remove mineral oil, and then filtered. After filtration, the resulting solid was slurried in 1200 mL of MCB, and heated to a temperature of 110° C., where it was held for 30 minutes, and then filtered while hot. This procedure was repeated twice. The resulting extracted solid was rinsed three times with 300 mL of iso-octane. The solid was dried under vacuum. The procatalyst contained 1.48 percent by weight Ti, and was designated as Procatalyst D1.

Example 9 (Comparative)

Procatalyst E was made according to U.S. Pat. No. 5,077, 357.

Accordingly, a mixed magnesium diethoxide and titanium ethoxide/chloride containing precursor corresponding to the formula $Mg_3Ti(OC_2H_5)_8Cl_2$ was slurried in a 50/50 (vol/vol) mixture of $TiCl_4$/MCB (19 liters/kilogram precursor) with DIBP (0.2 liter/kilogram precursor). After the mixture was heated at 113° C. for 60 minutes, it was filtered. The resulting moist mass was slurried in a 50/50 $TiCl_4$/MCB mixture (19 liters/kilogram precursor) at 113° C. for 30 minutes, filtered, and the process repeated once more. The resulting solid was rinsed with isopentane and then dried with flowing warm nitrogen. The resulting procatalyst contained 2.76 percent Ti by weight, and was not further treated prior to use.

Example 11

Approximately 400 mL of a 30 percent by weight slurry of procatalyst E in mineral oil was washed with 500 mL of iso-octane at room temperature to remove mineral oil, and then filtered. After filtration, the resulting solid was slurried in 1200 mL of MCB, and heated to a temperature of 130° C. and maintained at this temperature for 30 minutes and then filtered while hot. This procedure was repeated two more times. The resulting solid was rinsed three times with 300 mL of iso-octane. The solid was dried under vacuum. Ti content of the procatalyst was 1.47 percent by weight, and was designated as Procatalyst E1.

Example 13 (Comparative)

Procatalyst F was prepared by adding about 2.00 g of aluminum chloride to 40 mL of toluene, and then adding 1.73 mL of methyltriethoxysilane dropwise thereto while stirring. The mixture was stirred at 25° C. for 1 hour and then cooled to 5° C. A solution from a reaction of 3.84 mL of chlorobutane and 0.89 g of magnesium turnings in 20 mL of diisobutyl ether at 75° C. for 24 hours was added dropwise to the above reaction mixture under stirring, and the temperature of the reaction mixture was kept at in the range of −5 to 0° C. After the addition, temperature of the reaction mixture was raised slowly, then the reaction was continued at 30° C. for 1 hour. The solid was collected by filtration followed by washing with toluene and then pentane at ambient temperature.

About 2.5 g of the thus obtained solid was slurried in 15 mL of toluene, and then 8.2 mL of titanium tetrachloride and 0.6 mL of di-n-heptyl phthalate were added to this suspension, and reacted (chlorinated) under stirring at 90° C. for 1 hour. The solid was separated by filtration at the same temperature and washed with toluene and then pentane at ambient temperature. Again, the resulting solid was slurried in 15 mL of toluene and 8.2 mL of titanium tetrachloride, then reacted under stirring at 90° C. for 1 hour. The solid was separated by filtration at the same temperature, washed with toluene and then pentane at ambient temperature, and dried under vacuum. The Ti content of the procatalyst was 3.82 percent by weight, and was designated as Procatalyst F.

Example 14

Approximately 2.0 g of procatalyst F was slurried in 60 mL of toluene. The reaction mixture was heated at 90° C. for 30 minutes. The solid was collected by filtration, washed three times with 5 mL of pentane, and then dried under vacuum. The procatalyst contained 2.55 percent Ti by weight, and was designated as procatalyst F1.

Example 15 (Comparative)

Procatalyst G was prepared by slurrying 3.0 g of magnesium diethoxide in 60 mL of a 50/50 (vol/vol) mixture of $TiCl_4$/MCB additionally containing 1.25 mL of ethyl benzoate at 100° C. for 60 minutes. The resulting mixture was filtered while hot. The recovered solids were slurried in 60 mL of fresh 50/50 $TiCl_4$/MCB mixture at 100° C. for 60 minutes. The resulting mixture was filtered while hot. The recovered solid was slurried again in 60 mL of fresh 50/50 $TiCl_4$/MCB mixture at 100° C. for 60 minutes. The resulting mixture was filtered while hot and the solids recovered. The solids were rinsed three times with 70 mL of iso-octane at room temperature, and then dried for at least two hours under flowing nitrogen. The Ti content of the procatalyst thus obtained was 2.96 percent by weight, and was designated as Procatalyst G.

Example 16

Procatalyst G1 was prepared by slurring approximately 3.0 g of magnesium diethoxide in 60 mL of a 50/50 (vol/vol) mixture of $TiCl_4$/MCB additionally containing 1.25 mL of ethyl benzoate at 100° C. for 60 minutes. The resulting mixture was filtered while hot. The recovered solids were slurried in 60 mL of fresh 50/50 $TiCl_4$/MCB mixture at 100° C. for 60 minutes. The resulting mixture was filtered while hot. The recovered solids were slurried again in 60 mL of fresh 50/50 $TiCl_4$/MCB mixture at 100° C. for 60 minutes. The resulting mixture was filtered while hot and the solids rinsed with 70 mL of MCB at room temperature. The solid was extracted by slurrying with 60 mL of MCB at 100° C. for 30 minutes. The mixture was filtered while hot. The solids were rinsed three times with 70 mL of iso-octane at room temperature, and then dried for at least two hours under flowing nitrogen. The Ti content of the procatalyst thus obtained (Procatalyst G1) was 2.09 percent by weight.

As can be seen from the above table, procatalysts made with the process of the invention have a significantly reduced Ti content (compare A versus B9, D versus D1, E versus E1, F versus F1, and G versus G1), and result in catalyst compositions having a significantly improved selectivity (as evidenced by reduced XS) (compare 1 versus 2, (3,4) versus (5-8), (9,10) versus (11,12), 13 versus 14, 15 versus (16, 17)). The procatalysts of the invention also resulted in catalysts that produced polymer having increased polymer bulk density (compare 1 versus 2, (3,4) versus (5-8), (9,10) versus (11,12). Although the procatalysts of the invention have significantly reduced Ti content, these procatalysts typically have an increased productivity based on per gram Ti (compare 1 versus 2, (3,4) versus (5-8), (9,10) versus (11,12), 15 versus (16, 17)). Finally, the procatalysts of the invention enable the use of a significantly smaller amount of external donor to achieve a given xylene solubles content (compare 3 versus 8, 9 versus 12, 15 versus 17).

Examples 18-37

A series of polymerizations using various procatalysts were conducted according to polymerization procedure (A). The SCA was dicyclopentyldimethoxysilane. Specific procatalysts, if not previously disclosed, were prepared as follows. Results are disclosed in Table 6.

Example 18 (Comparative)

Procatalyst H was prepared in substantially the same manner as procatalyst D. The procatalyst contained 2.14 percent Ti by weight.

Example 19

Approximately 1.0 g of dried procatalyst H was slurried in 30 mL of MCB at 110° C. for 1 hour and then filtered to remove solvent. The resulting extracted solid was further washed with 5 mL of pentane three times at room temperature to remove residual solvent. Thereafter, the solid was dried under vacuum, and was designated as procatalyst H1. The Ti content of the resulting procatalyst was 1.25 percent by weight.

TABLE 5

| Ex. | Procat | Ti[1] | SCA | SCA/Ti (mol/mol) | Activity (g/μg Ti) | XS[1] | Melt Flow (dg/min) | Bulk Density (g/cc) |
|---|---|---|---|---|---|---|---|---|
| 1* | A | 2.70 | DCPDMS | 25 | 0.75 | 1.6 | 5.3 | 0.31 |
| 2 | B9 | 1.32 | DCPDMS | 25 | 0.77 | 0.9 | 5.0 | 0.48 |
| 3* | D | 2.55 | DCPDMS | 28 | 1.34 | 1.5 | 2.2 | 0.37 |
| 4* | D | 2.55 | DCPDMS | 1.3 | 1.33 | 2.9 | 2.1 | 0.42 |
| 5 | D1 | 1.48 | DCPDMS | 48 | 1.46 | 0.5 | 2.5 | 0.45 |
| 6 | D1 | 1.48 | DCPDMS | 3.1 | 1.17 | 0.9 | 1.6 | 0.44 |
| 7 | D1 | 1.48 | DCPDMS | 1.6 | 1.66 | 1.4 | 4.9 | 0.42 |
| 8 | D1 | 1.48 | DCPDMS | 1.0 | 1.28 | 1.5 | 4.5 | 0.47 |
| 9* | E | 2.76 | DCPDMS | 26 | 0.84 | 1.8 | 3.3 | 0.40 |
| 10* | E | 2.76 | DCPDMS | 1.1 | 0.70 | 3.8 | 1.6 | 0.37 |
| 11 | E1 | 1.47 | DCPDMS | 49 | 1.00 | 0.9 | 4.6 | 0.44 |
| 12 | E1 | 1.47 | DCPDMS | 2.1 | 1.43 | 1.3 | 4.1 | 0.45 |
| 13* | F | 3.82 | DCPDMS | 19 | 0.63 | 2.1 | 5.7 | 0.38 |
| 14 | F1 | 2.55 | DCPDMS | 28 | 0.32 | 1.4 | 4.5 | 0.36 |
| 15* | G | 2.96 | PEEB | 34 | 0.54 | 3.9 | 1.8 | 0.30 |
| 16 | G1 | 2.09 | PEEB | 48 | 0.50 | 2.3 | 4.8 | 0.27 |
| 17 | G1 | 2.09 | PEEB | 12 | 0.64 | 2.5 | 2.5 | 0.30 |

*comparative, not an example of the invention
[1]percent by weight

Example 20

Approximately 1.0 g of dried procatalyst H was slurried in 30 mL of MCB at 120° C. for 1 hour and then filtered to remove solvent. The resulting solid was further washed with 5 mL of pentane three times at room temperature to remove residual solvent. Thereafter, the solid was dried under vacuum, and was designated as procatalyst H2. The Ti content of the procatalyst was 1.08 percent by weight.

Example 21

About 1.0 g of dried procatalyst H was slurried in 30 mL of MCB at 130° C. for 1 hour and then filtered to remove solvent. The resulting extracted solid was further washed with 5 mL of pentane three times at room temperature to remove residual solvent. Thereafter, the solid was dried under vacuum and was designated as Procatalyst H3. The Ti content of the procatalyst was 0.89 percent by weight.

Example 22

Approximately 1.0 g of dried procatalyst H was slurried in 30 mL of o-xylene at 130° C. for 1 hour and then filtered to remove solvent. The resulting extracted solid was further washed with 5 mL of pentane three times at room temperature to remove residual o-xylene. Thereafter, the solid was dried under vacuum, and was designated as procatalyst H4. The Ti content of the procatalyst H4 was 1.03 percent by weight.

Example 23

About 1.0 g of dried procatalyst D was slurried in 30 mL of MCB at 110° C. for 30 minutes and then filtered to remove solvent. The resulting extracted solid was further washed with 5 mL of pentane three times at room temperature to remove residual solvent. Thereafter, the solid was dried under vacuum, and the procatalyst was designated as Procatalyst D2. The Ti content of the procatalyst was 1.68 percent by weight.

Example 24

About 1.0 g of dried procatalyst D was slurried in 30 mL of MCB at 110° C. for 1 hour and then filtered. The resulting extracted solid was further washed with 5 mL of pentane three times at room temperature to remove residual extractant. Thereafter, the solid was dried under vacuum, and the procatalyst was designated as Procatalyst D3. The Ti content of the procatalyst was 1.52 percent by weight.

TABLE 6

| Ex. | Procat. | Time (hr) | Temp (° C.) | Ti[1] | SCA[2]/Ti (mol/mol) | Activity (g/µg Ti) | XS[1] | Melt Flow (dg/min) | Bulk Density (g/cc) |
|---|---|---|---|---|---|---|---|---|---|
| 18* | H | | | 2.14 | | | | | |
| 19 | H1 | 1.0 | 110 | 1.25 | | | | | |
| 20 | H2 | 1.0 | 120 | 1.08 | | | | | |
| 21 | H3 | 1.0 | 130 | 0.89 | | | | | |
| 22 | H4 | 1.0 | 130 | 1.03 | | | | | |
| 3* | D | | | 2.55 | 28 | 1.34 | 1.5 | 2.2 | 0.37 |
| 23 | D2 | 0.5 | 110 | 1.68 | 44 | 0.94 | 1.3 | | |
| 24 | D3 | 1.0 | 110 | 1.52 | 47 | 1.20 | 1.2 | | |
| 1* | A | | | 2.70 | 25 | 0.75 | 1.6 | 5.3 | 0.31 |
| 25 | A1 | 1.0 | 100 | 2.56 | 25 | 0.45 | 1.9 | 10.6 | 0.40 |
| 26 | A2 | 2.0 | 100 | 2.44 | 25 | | | | |
| 27 | A3 | 3.0 | 100 | 2.42 | 25 | 0.94 | 1.1 | 2.0 | 0.37 |
| 28 | A4 | 4.0 | 100 | 2.31 | 25 | 1.20 | 1.3 | 3.1 | 0.42 |
| 29 | A5 | 5.0 | 100 | 2.27 | 25 | 1.11 | 1.1 | 1.2 | 0.37 |
| 30 | A6 | 8.0 | 100 | 2.07 | 25 | 1.01 | 1.0 | 0.5 | 0.36 |
| 31 | A7 | 32.0 | 100 | 1.87 | 25 | 1.23 | 0.7 | 3.5 | 0.40 |
| 32 | B1 | 1.0 | 130 | 1.35 | | | | | |
| 33 | B5 | 1.0 | 130 | 1.50 | | | | | |
| 34* | C | | | 2.70 | 25 | 0.95 | 1.8 | 0.7 | 0.30 |
| 35 | C1 | 1.0 | 110 | 1.80 | 25 | 1.14 | 1.7 | 0.5 | 0.32 |
| 36 | C2 | 2.0 | 110 | 1.10 | 25 | 1.20 | 1.0 | 1.6 | 0.39 |
| 37 | C3 | 3.0 | 110 | 1.00 | 25 | 1.25 | 0.7 | 2.0 | 0.39 |

*Comparative, not an example of the invention
[1]percent by weight

The results in Table 6 reveal that the procatalyst properties can be adjusted by controlling the extraction conditions, such as extractant type, temperature, extractant amount, contact duration, and number of extractions. For example, higher temperature extraction results in lower Ti content (compare 19 versus 20 versus 21). The type of extractant used also may affect the Ti content of the procatalyst (compare 21 versus 22). Extracting at an elevated temperature or for longer periods of time also resulted in lower Ti content (compare 23 versus 24). Repeated extractions (compare 1 versus 25-31) also reduced the Ti content.

Examples 38-55

The following set of examples, the results of which are shown in Table 7 below, illustrate the advantageous properties achieved when a variety of different halide compounds were used to make procatalysts that were both extracted and substituted in accordance with the invention. Polymerizations were conducted according to polymerization process (A)

using dicyclopentyldimethoxysilane as SCA. Specific procatalysts, if not previously disclosed, were prepared as follows:

Example 39

Procatalyst I1 was prepared by slurrying 1.0 g of dry procatalyst A in a solution of 115 mg of $VCl_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and V contents, which resulted in 1.50 percent and 2.54 percent by weight, respectively.

Example 40

Procatalyst I2 was prepared by slurrying 1.0 g of dry procatalyst A in a solution of 1.50 g of $VCl_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and V contents, which resulted in 0.44 percent and 10.93 percent by weight, respectively.

Example 41

Procatalyst 13 was prepared by slurrying 1.0 g of dry procatalyst A in a solution of 115 mg of $VCl_4$ and 113 mg of $TiCl_4$ in 10 mL of MCB ($TiCl_4$=1.0 percent by weight of MCB) at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and V contents, which resulted in 1.57 percent and 1.99 percent by weight, respectively.

Example 42

Procatalyst I4 was prepared by slurrying 1.0 g of dry procatalyst A in a solution of 115 mg of $VCl_4$, 113 mg of $TiCl_4$, and 166 mg of DIBP in 10 mL of MCB ($TiCl_4$=1.0 percent by weight of MCB) at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and V contents, which resulted in 2.38 percent and 1.54 percent by weight, respectively.

Example 43

Procatalyst I5 was prepared by slurrying 1.0 g of dry procatalyst A in a solution of 103 mg of $VOCl_3$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and V contents, which resulted in 2.11 percent and 0.26 percent by weight, respectively.

Example 44

Procatalyst I6 was prepared by slurrying 1.0 g of dry procatalyst A in a solution of 305 mg of $ZrCl_4$(DIBP) and 113 mg of $TiCl_4$ in 10 mL of MCB ($TiCl_4$=1.0 percent by weight of MCB) at 100° C. for 60 minutes and then filtering. The resulting solid was further washed with 5 mL of pentane three times at room temperature to remove residual MCB. Thereafter, the extracted and substituted solid was dried under vacuum. The solid procatalyst component was then measured for Ti and Zr contents, which resulted in 1.51 percent and 2.97 percent by weight, respectively.

Example 45

Procatalyst I7 was prepared by slurrying 1.0 g of dry procatalyst A in a solution of 237 mg of $WCl_6$ in 10 mL of MCB at 100° C. for 60 minutes and then filtering to remove solvent. The resulting extracted and substituted solid was further washed with 5 mL of pentane three times at room temperature to remove residual MCB. Thereafter, the solid was dried under vacuum. The solid procatalyst component was then measured for Ti and W contents, which resulted in 1.20 percent and 3.84 percent by weight, respectively.

Example 46

Procatalyst I8 was prepared by slurrying 1.0 g of dry procatalyst A in a solution of 220 mg of $TiBr_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti content, which was 2.11 percent by weight.

Example 47

Procatalyst I9 was prepared by slurrying 1.0 g of dry procatalyst A in a solution of 2.10 g of $TiBr_4$ in 75 mL of MCB at 100° C. for 12 hours and then filtering. The resulting extracted and substituted solid was further washed with 5 mL of pentane three times at room temperature to remove residual MCB. Thereafter, the solid was dried under vacuum. The solid procatalyst component was then measured for Ti content, which was 1.08 percent by weight.

Example 48

Procatalyst I10 was prepared by slurrying 1.0 g of dry procatalyst powder from A1 in example 1 in a solution of 156 mg of $SnCl_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and Sn contents, which resulted in 1.98 percent and 0.03 percent by weight, respectively.

Example 49

Procatalyst I11 was prepared by slurrying 1.0 g of dry procatalyst A in a solution of 310 mg of $SnCl_4$ in 10 mL of MCB at 100° C. for 60 minutes and then filtering. The resulting solid was further washed with 5 mL of pentane three times at room temperature to remove residual MCB. Thereafter, the solid was dried under vacuum. The solid procatalyst component was then measured for Ti and Sn contents, which resulted in 2.06 percent and 0.10 percent by weight, respectively.

Example 50

Procatalyst I12 was prepared by slurrying 1.0 g of dry procatalyst A in a solution of 620 mg of $SnCl_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and Sn contents, which resulted in 1.88 percent and 0.13 percent by weight, respectively.

Example 51

Procatalyst I13 was prepared by slurrying 1.0 g of dry procatalyst A in a solution of 1.24 g of $SnCl_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and Sn contents, which resulted in 1.89 percent and 0.18 percent by weight, respectively.

Example 52

Procatalyst I14 was prepared by slurrying 1.0 g of dry procatalyst A in a solution of 7.75 g of $SnCl_4$ in 10 mL of MCB at 100° C. for 60 minutes and then filtering. The resulting extracted and substituted solid was further washed with 5 mL of pentane three times at room temperature to remove residual MCB. Thereafter, the solid was dried under vacuum. The solid procatalyst component was then measured for Ti and Sn contents, which resulted in 1.49 percent and 0.56 percent by weight, respectively.

Example 53 (Comparative)

Procatalyst J was prepared in substantially the same manner as procatalyst E. The unextracted procatalyst contained 2.50 percent Ti by weight.

Example 54

Procatalyst J1 was prepared by slurrying 1.0 g of dry procatalyst J in a solution of 268 mg of $ZrCl_4$(DIBP) and 99 mg of $TiCl_4$ in 10 mL of MCB ($TiCl_4$=0.9 percent by weight of MCB) at 100° C. for 60 minutes and then filtering to remove solvent. The resulting extracted and substituted solid was further washed with 5 mL of pentane three times at room temperature to remove residual MCB. Thereafter, the solid was dried under vacuum. The solid procatalyst component was then measured for Ti content, which was 1.53 percent by weight.

Example 55

Procatalyst J2 was prepared by slurrying 10.0 g of dry procatalyst J in an extraction mixture comprising 30.0 mL of dicyclopentyldichlorosilane in 300 mL of MCB at 130° C. for 30 minutes and then filtering. The resulting extracted and substituted solid was further washed with 5 mL of pentane four times at room temperature to remove residual MCB. Thereafter, the solid was dried under vacuum. The solid procatalyst component was then measured for Ti content, which was 1.00 percent by weight.

TABLE 7

| Ex. | Procat. | Metal Halide | Metal Halide/Ti[1] (mol/mol) | Ti[2] | SCA/Ti (mol/mol) | Activity (g/μg Ti) | XS[2] | Melt Flow (dg/min) | Bulk Density (g/cc) |
|---|---|---|---|---|---|---|---|---|---|
| 1* | A | | | 2.70 | 25 | 0.75 | 1.6 | 5.3 | 0.31 |
| 38 | B16 | none | | 2.46 | | | | | |
| 39 | I1 | $VCl_4$ | 1 | 1.50 | 48 | 1.65 | 0.7 | 1.6 | 0.37 |
| 40 | I2 | $VCl_4$ | 10 | 0.44 | 162 | 3.68 | 0.7 | 4.8 | 0.42 |
| 41 | I3 | $VCl_4$ + $TiCl_4$ | 1 + 1 | 1.57 | 45 | 2.43 | 1.0 | 1.9 | 0.38 |
| 42 | I4 | $VCl_4$ + $TiCl_4$ + DIBP | 1 + 1 | 2.38 | 25 | 0.84 | 0.6 | 4.4 | 0.34 |
| 43 | I5 | $VOCl_3$ | 1 | 2.11 | 34 | 0.91 | 0.9 | 1.8 | 0.41 |
| 44 | I6 | $ZrCl_4$(DIBP) + $TiCl_4$ | 1 + 1 | 1.51 | 47 | 1.55 | 0.4 | 4.0 | 0.42 |
| 45 | I7 | $WCl_6$ | 1 | 1.20 | 59 | 2.29 | 0.7 | 1.9 | 0.35 |
| 46 | I8 | $TiBr_4$ | 1 | 2.11 | 25 | 0.65 | 1.2 | 2.9 | 0.41 |
| 47 | I9 | $TiBr_4$ | 10 | 1.08 | 66 | 1.20 | 0.5 | 1.1 | 0.36 |
| 48 | I10 | $SnCl_4$ | 1 | 1.98 | 36 | 0.66 | 0.8 | 5.4 | 0.46 |
| 49 | I11 | $SnCl_4$ | 2 | 2.06 | 25 | 0.91 | 0.8 | 3.5 | 0.39 |
| 50 | I2 | $SnCl_4$ | 4 | 1.88 | 25 | 0.52 | 0.9 | 14.0 | 0.28 |
| 51 | I13 | $SnCl_4$ | 8 | 1.89 | 25 | 0.59 | 0.9 | 6.0 | 0.41 |
| 52 | I14 | $SnCl_4$ | 50 | 1.49 | 25 | 0.54 | 0.5 | 3.2 | 0.44 |
| 53* | J | | | 2.50 | 25 | 1.20 | 1.5 | 3.7 | 0.40 |
| 54 | J1 | $ZrCl_4$(DIBP) + $TiCl_4$ | 1 + 1 | 1.53 | 47 | 1.46 | 0.7 | 3.1 | 0.41 |
| 9* | E | | | 2.76 | 26 | 0.84 | 1.8 | 3.3 | 0.40 |
| 55 | J2 | $Cp_2SiCl_2$ | 22 | 1.00 | 71 | 0.51 | 0.9 | 2.6 | 0.45 |

*comparative, not an example of the invention
[1]Ti here refers to the amount of Ti on the procatalyst prior to extraction.
[2]percent by weight Table 7 shows that halide salt compounds or their mixtures in combination with the present extraction process can be used without adverse effect (compare 1 versus (39-52), 53 versus 54, 9 versus 55). Halide salt compounds or their mixtures appear to facilitate Ti removal so that lower extraction temperatures can be used to achieve equivalent results (compare 1 versus 38 versus (39-54)). Using larger amount of halide compounds or their mixtures in combination with the present extraction process results in lower Ti content (compare 39 versus 40, 46 versus 47, 48 versus 49 versus 50 versus 51 versus 52) in the final solid procatalyst.

Examples 56-65

The following set of examples, the results of which are shown in Table 8 below, illustrate the advantageous properties achieved when a variety of different selectivity control agents were to make catalysts in accordance with the invention.

Example 56

Example 9 was repeated, except diphenyldimethoxysilane (Ph$_2$Si(OMe)$_2$) was used as the SCA.

Example 57

Example 11 was repeated, except diphenyldimethoxysilane (Ph$_2$Si(OMe)$_2$) was used as the SCA.

Example 58

Example 9 was repeated, except n-propyltrimethoxysilane (NPTMS) was used as the SCA.

Example 59

Example 11 was repeated, except n-propyltrimethoxysilane (NPTMS) was used as the SCA.

Example 60

Example 9 was repeated, except methylcyclohexyldimethoxysilane (MCHDMS) was used as the SCA.

Example 61

Example 11 was repeated, except methylcyclohexyldimethoxysilane (MCHDMS) was used as the SCA.

Example 62

Example 9 was repeated, except ethyltriethoxysilane (ETES) was used as the SCA.

Example 63

Example 11 was repeated, except ethyltriethoxysilane (ETES) was used as the SCA.

Example 64

Example 9 was repeated, except 2,2,6,6-tetramethylpiperidine (TMPY) was used as the SCA.

Example 65

Example 11 was repeated, except 2,2,6,6-tetramethylpiperidine (TMPY) was used as the SCA.

TABLE 8

| Ex. | Procat. | Ti** | SCA | SCA/Ti (mol/mol) | Activity (g/μg Ti) | XS** | Melt Flow (dg/min) | Bulk Density (g/cc) |
|---|---|---|---|---|---|---|---|---|
| 1* | A | 2.70 | DCPDMS | 25 | 0.75 | 1.6 | 5.3 | 0.31 |
| 2 | B9 | 1.32 | DCPDMS | 25 | 0.77 | 0.9 | 5.0 | 0.48 |
| 56* | E | 2.76 | Ph$_2$Si(OMe)$_2$ | 26 | 0.96 | 3.7 | 18.3 | 0.44 |
| 57 | E1 | 1.47 | Ph$_2$Si(OMe)$_2$ | 26 | 1.44 | 1.6 | 4.7 | 0.46 |
| 58* | E | 2.76 | NPTMS | 26 | 0.87 | 2.9 | 4.1 | 0.42 |
| 59 | E1 | 1.47 | NPTMS | 26 | 0.91 | 1.4 | 12.1 | 0.48 |
| 60* | E | 2.76 | MCHDMS | 26 | 0.86 | 3.0 | 2.9 | 0.41 |
| 61 | E1 | 1.47 | MCHDMS | 26 | 1.36 | 1.2 | 5.3 | 0.46 |
| 62* | E | 2.76 | ETES | 26 | 0.68 | 3.4 | 5.2 | 0.43 |
| 63 | E1 | 1.47 | ETES | 26 | 1.29 | 2.1 | 12.9 | 0.48 |
| 64* | E | 2.76 | TMPY | 26 | 1.16 | 5.0 | 4.3 | 0.37 |
| 65 | E1 | 1.47 | TMPY | 26 | 1.37 | 3.7 | 1.6 | 0.42 |

*Comparative, not an example of the invention
**percent by weight

The results of Table 8 reveal that, at constant SCA/Ti (molar/molar) ratio for various SCAs, the inventive catalysts produced greater quantities of polymer, as well as polymers having lower XS and higher bulk density (compare I versus 2, 56 versus 57, 58 versus 59, 60 versus 61, 62 versus 63, and 64 versus 65).

Examples 66-69

The following set of examples, the results of which are shown in Table 9 below, illustrate that many of the advantageous properties of the invention can be achieved while using reduced levels of selectivity control agent.

Example 66

Example 9 was repeated, except n-propyltrimethoxysilane (NPTMS) was used as the SCA.

Example 67

Example 11 was repeated, except n-propyltrimethoxysilane (NPTMS) was used as the SCA.

Example 68

Procatalyst E2 was prepared in substantially the same manner as procatalyst E1 used as an example 11. The Ti content of the resulting exchanged solid procatalyst was 1.37 percent by weight.

Example 69

Example 68 was repeated, except a different SCA/Ti ratio was used.

Table 9 reveals that the inventive catalysts of the invention produced polymer with lower XS and higher flexural modulus than comparative catalyst compositions (compare 66 versus 67, (9, 10) versus (11, 12, 68, 69), and 15 versus (16, 17)). Table 9 also illustrates that, by using catalysts of the invention, polymers having low XS can be achieved with very low SCA/Ti (molar/molar) ratio, and that using a lower amount of SCA does not have an adverse effect on flexural modulus of the resulting polymer. Consequently, high flexural modulus can be obtained with a small amount of SCA using catalysts of the invention (compare (9, 10) versus (11, 12, 68, 69), and 15 versus (16, 17)).

Examples 70-80

The following set of polymerization examples, the results of which are shown in Table 10 below, illustrate that the oligomer content of polymers can be lowered, using the catalysts of the present invention. Such polymers have improved organoleptic properties. Polymerizations 70 and 71 were performed using polymerization procedure (A) using n-propyltrimethoxysilane SCA. Polymerizations 72-80 employed polymerization procedure (B) using dicyclopentyldimethoxysilane SCA. Specific procatalysts, if not previously disclosed, were prepared as follows.

Example 72 (Comparative)

Procatalyst K was prepared in substantially the same manner as procatalyst D. Procatalyst K contained 2.26 percent Ti by weight, and it was used to polymerize propylene using polymerization procedure (B).

Example 79

Procatalyst E3 was prepared in substantially the same manner as procatalyst E1 in example 11. The Ti content was 1.19 percent by weight.

TABLE 9

| Ex. | procat. | Ti** | SCA | SCA/Ti mol/mol | Activity (g/μg Ti) | XS** | Melt Flow (dg/min) | Bulk Density (g/cc) | Mod. Kpsi (MPa) |
|---|---|---|---|---|---|---|---|---|---|
| 66* |    | 2.76 | NPTMS | 26  | 0.87 | 3.2 | 3.5 | 0.42 | 226 (1,560) |
| 67  | E1 | 1.47 | NPTMS | 48  | 0.89 | 1.4 | 7.3 | 0.42 | 253 (1,740) |
| 9*  | E  | 2.76 | DCPDMS | 26 | 0.84 | 1.8 | 3.3 | 0.40 | 253 (1,740) |
| 10* | E  | 2.76 | DCPDMS | 1.1 | 0.70 | 3.8 | 1.6 | 0.37 | 219 (1,510) |
| 11  | E1 | 1.47 | DCPDMS | 49 | 1.00 | 0.9 | 4.6 | 0.44 | 279 (1,920) |
| 12  | E1 | 1.47 | DCPDMS | 2.1 | 1.43 | 1.3 | 4.1 | 0.45 | 272 (1,880) |
| 68  | E2 | 1.37 | DCPDMS | 52 | 0.96 | 0.8 | 6.3 | 0.46 | 275 (1,900) |
| 69  | E2 | 1.37 | DCPDMS | 2.3 | 0.95 | 1.2 | 2.8 | 0.46 | 265 (1,830) |
| 15* | G  | 2.96 | PEEB | 34  | 0.54 | 3.9 | 1.8 | 0.30 | 212 (1,460) |
| 16  | G1 | 2.09 | PEEB | 48  | 0.50 | 2.3 | 4.8 | 0.27 | 255 (1,760) |
| 17  | G1 | 2.09 | PEEB | 12  | 0.64 | 2.5 | 2.5 | 0.30 | 230 (1,590) |

*Comparative, not an example of the invention
**percent by weight

TABLE 10

| Ex. | Procat. | Ti** | SCA | Activity (g/μg Ti) | XS** | Melt Flow (dg/min) | Bulk Density (g/cc) | Oligomers (ppm) C15 | C21 |
|---|---|---|---|---|---|---|---|---|---|
| 70* | D | 2.55 | NPTMS | 1.57 | 2.5 | 3.9 | 0.40 | 133 | 133 |
| 71 | D1 | 1.48 | NPTMS | 1.48 | 5.0 | 4.5 | 0.38 | 93 | 102 |
| 72* | K | 2.26 | DCPDMS | 1.06 | 1.4 | 35 | 0.35 | 546 | 531 |
| 73 | D1 | 1.48 | DCPDMS | 1.47 | 1.3 | 34 | 0.35 | 491 | 478 |
| 74* | K | 2.26 | DCPDMS | 1.06 | 1.4 | 5.3[1] | 0.36 | 248 | 250 |
| 75 | D1 | 1.48 | DCPDMS | 1.24 | 0.8 | 5.2[2] | 0.35 | 207 | 210 |
| 76* | E | 2.76 | DCPDMS | 0.44 | 1.2 | 30 | 0.37 | 440 | 426 |
| 77 | E2 | 1.37 | DCPDMS | 0.80 | 1.3 | 29 | 0.41 | 404 | 382 |
| 78* | E1 | 2.76 | DCPDMS | 0.44 | 1.2 | 34[3] | 0.37 | 466 | 439 |
| 79 | E3 | 1.19 | DCPDMS | 1.16 | 2.2 | 34 | 0.42 | 417 | 401 |
| 80 | E2 | 1.37 | DCPDMS | 0.80 | 1.3 | 33[4] | 0.41 | 394 | 373 |

*comparative, not an example of the invention
**percent by weight
[1]The melt flow rate was adjusted compared to Ex. 72 by use of $H_2$
[2]The melt flow rate was adjusted compared to Ex. 73 by use of $H_2$
[3]The melt flow rate was adjusted compared to Ex. 76 by use of $H_2$
[4]The melt flow rate was adjusted compared to Ex. 77 by use of $H_2$ Table 10 illustrates that at similar melt flow, polymers made from the catalysts according to the present invention contain less oligomers than polymers made from conventional catalysts (compare 70 versus 71, 72 versus 73, 74 versus 75, 76 versus 77, and 78 versus (79, 80)). The data demonstrate that reduction in oligomer content also is independent of the type of SCA used.

Examples 81-87

The following set of polymerization examples, the results of which are shown in Table 11 below, illustrate that the amount of hydrogen needed can be reduced when using catalysts according to the present invention. All polymerizations were conducted according to polymerization procedure (B) using dicyclopentyldimethoxysilane SCA.

TABLE 11

| Ex. | Procat. | Ti (percent) | H2/C3 (mol/mol) | Al/Ti (mol/mol) | Al/SCA (mol/mol) | Melt Flow (g/10 min) |
|---|---|---|---|---|---|---|
| 81* | E | 2.76 | 0.110 | 50 | 1.1 | 30.3 |
| 82* | E | 2.76 | 0.119 | 50 | 1.1 | 36.7 |
| 83 | E2 | 1.37 | 0.097 | 50 | 10.0 | 33.5 |
| 84 | E2 | 1.37 | 0.100 | 50 | 10.0 | 33.9 |
| 85 | E2 | 1.37 | 0.091 | 100 | 4.0 | 39.0 |
| 86 | E2 | 1.37 | 0.082 | 100 | 4.0 | 38.2 |
| 87 | E2 | 1.37 | 0.090 | 100 | 4.0 | 34.1 |

*Comparative, not an example of the invention

The above table reveals that a lower hydrogen/propylene ratio can be used when the procatalysts of the present invention are employed. The table also shows that the Al/SCA ratio can be increased when the procatalysts of the present invention are used, thereby significantly reducing costs due to use of lower quantities of SCA.

While the invention has been described in detail with reference to particularly preferred embodiments and examples, those skilled in the art will appreciate that various modifications may be made to the invention without departing from the spirit and scope thereof.

What is claimed is:

1. A method of making a solid procatalyst composition for use in a Ziegler-Natta olefin polymerization procatalyst composition, said method comprising:

(a) contacting a precursor composition comprising a magnesium compound with a titanium halide compound and an internal electron donor in any order, in a suitable reaction medium to prepare a solid procatalyst composition, wherein the solid precursor compound is a magnesium dialkoxide or a carboxylated magnesium dialkoxide or is of the formula $Mg_dTi(OR^e)_eX_f(ED)_g$, where $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; ED is an electron donor; d is 1-36; e is 1-10; f is 1-40 and g is 0.1-3 and wherein the precursor is contacted with the titanium halide compound and the electron donor while in a solid form;

(b) separating the solid procatalyst from the reaction medium, (c) rinsing the solid procatalyst from step (b), (d) subsequent to the rinsing step (c), extracting the solid procatalyst composition by contacting the same one or more times with a liquid diluent selected from the group consisting of aliphatic, cycloaliphatic and aromatic hydrocarbons, halogenated derivatives thereof, and mixtures of the foregoing at an elevated temperature from about 115° C. to about 200° C. for a period of time sufficient to prepare a solid procatalyst composition having a titanium content of from 0.15% to 2% by weight, and (e) recovering the solid procatalyst composition.

2. The method of claim 1 wherein the diluent is selected from the group consisting of toluene, xylene, isopentane, isooctane, chlorobenzene, chlorotoluene and dichlorobenzene.

3. The method of claim 2 wherein the diluent is chlorobenzene or chlorotoluene.

4. The method of claim 1 wherein extraction takes place at a temperature within the range of from about 120° C. to about 150° C.

5. The method of claim 1 where the extraction is conducted for a period of time ranging from about 5 minutes to about 1 day.

6. The method of claim 1 wherein the extraction is repeated at least once.

7. The method of claim 1 wherein the solid procatalyst is contacted with a halide salt compound in a substitution reaction before or during the extraction step.

8. The method of claim 1 wherein the solid procatalyst is dried prior to extraction.

9. The method of claim 1, wherein the internal electron donor is selected from the group consisting of: carboxylic acid esters and ether derivatives of carboxylic acid esters.

10. The method of claim 1, wherein the internal electron donor is selected from the group consisting of: alkyl esters of aromatic monocarboxylic acids, alkyl esters of aromatic dicarboxylic acids, ether derivatives of alkyl esters of aromatic monocarboxylic acids, and ether derivatives of alkyl esters of aromatic dicarboxylic acids.

11. The method of claim 1, wherein the internal electron donor is selected from the group consisting of: alkyl esters of dicarboxylic acids and ether derivatives of alkyl esters of dicarboxylic acids.

12. The method of claim 1, wherein the electron donor is a phthalate.

13. The method of claim 12, wherein the electron donor is selected from the group consisting of diethylphthalate, diisobutylphthalate, and diisopropyl terephthalate.

* * * * *